United States Patent
Ezuhara et al.

(10) Patent No.: US 6,805,814 B2
(45) Date of Patent: Oct. 19, 2004

(54) PHOSPHOR FOR LIGHT-EMITTING ELEMENT EXCITED BY VACUUM ULTRA-VIOLET RAY

(75) Inventors: Takayoshi Ezuhara, Tsukuba (JP); Susumu Miyazaki, Kitasoma-gun (JP); Toshinori Isobe, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/445,961

(22) Filed: May 28, 2003

(65) Prior Publication Data

US 2004/0036392 A1 Feb. 26, 2004

(30) Foreign Application Priority Data

May 31, 2002 (JP) ........................................ 2002-158910

(51) Int. Cl.$^7$ .................... C09K 11/77; C09K 11/64; H01J 11/00
(52) U.S. Cl. ................ 252/301.4 R; 313/582; 313/584; 313/643; 313/486
(58) Field of Search ................. 252/301.4; 313/486, 313/643, 582, 584

(56) References Cited

U.S. PATENT DOCUMENTS

| 4,644,223 A | 2/1987 | de Hair et al. |
| 6,045,721 A | 4/2000 | Zachau et al. |

FOREIGN PATENT DOCUMENTS

| EP | 1 073 089 A1 | 1/2001 |
| JP | 5-86366 A | 4/1993 |
| JP | 10-1666 A | 1/1998 |
| JP | 2002-121550 A | 4/2002 |
| WO | WO 99/34389 A1 | 7/1999 |

OTHER PUBLICATIONS

T. Hisamune et al., "Development of Mn$^{2+}$ Activated Ba–Sr–Mg–aluminate Green Phosphors for PDPs", J. Illum. Engng. Inst. Japan, vol. 83, No. 5, (1999), pp. 306–313 with Abstract.

S.V. Bulyarskii et al., "Emission from Mn$^{4+}$ Ions in Gadolinium Gallium Garnet at High Laser Pumping Intensities", Technical Physics Letters, vol. 28, No. 6, (2002), 475–478.

Phosphor Handbook, Ohmsya Ltd., 1987, pp. 104–105, 226–227 and 332–333, with English translation.

*Primary Examiner*—C. Melissa Koslow
(74) *Attorney, Agent, or Firm*—Sughrue Mion, PLLC

(57) ABSTRACT

The objective of the present invention is to provide a phosphor for use in a light emitting element excited by vacuum ultraviolet-ray that has high brightness even after plasma exposure. This object is achieved by a phosphor comprising a compound represented by a formula $M^1_{1-a}M^2_{11-b}Mn_{a+b}O_{18-(a+b)/2}$ (wherein, $M^1$ represents at least one of materials selected from the group consisting of La, Y and Gd, and $M^2$ represents at least one of materials selected from the group consisting of Al and Ga, a represents a number in a range from not less than 0 to less than 1, b represents a number in a range from not less than 0 to less than 1, and sum of a and b is greater than 0), and by a light emitting element excited by vacuum ultraviolet-ray comprising the above-mentioned phosphor.

7 Claims, No Drawings

PHOSPHOR FOR LIGHT-EMITTING ELEMENT EXCITED BY VACUUM ULTRA-VIOLET RAY

FIELD OF THE INVENTION

The present invention relates to a phosphor that is suitable for a light-emitting element excited by vacuum ultraviolet-ray, such as a plasma display panel (hereinafter, referred to as "PDP") and a rare gas lamp, and also relates to a light-emitting element excited by vacuum ultraviolet-ray comprising the phosphor.

BACKGROUND OF THE INVENTION

A phosphor has been used for elements excited by vacuum ultraviolet-ray such as PDP's and rare gas lamps, and the phosphor which is excited by vacuum ultraviolet rays to emit light has already been known. For example, the following phosphors have been practically used: aluminate phosphors, such as $BaMgAl_{10}O_{17}$: Eu for use as a blue phosphor and $BaAl_{12}O_{19}$: Mn for use as a green phosphor (JP10-1666A); silicate phosphors, such as $CaMgSi_2O_6$: Eu for use as a blue phosphor and $Zn_2SiO_4$: Mn for use as a green phosphor; and borate phosphors, such as $(Y, Gd) BO_3$: Eu for use as a red phosphor, and these materials have been used for light emitting element excited by vacuum ultraviolet-ray such as PDP's and rare gas lamps.

Light emitting element emit visible light radiated from phosphor which is irradiated and excited by vacuum ultraviolet-ray radiated from the plasma, which is generated during the discharge of the light emitting element in a rare gas. Consequently, the phosphor is exposed by plasma to cause a reduction in the brightness of the phosphor after plasma exposure.

SUMMARY OF THE INVENTION

The objective of the present invention is to provide a phosphor for use in a light emitting element excited by vacuum ultraviolet-ray that has high brightness even after plasma exposure.

Under such circumstances, the inventors of the present invention have extensively studied in order to solve the above-mentioned problems, and found that, among aluminate phosphors containing Mn as an activating agent and gallium acid salt phosphors containing Mn as an activating agent, a phosphor obtained from an aluminate or a gallium acid salt having a specific composition has high brightness after plasma exposure, and is effectively used as a phosphor for use in a light emitting element excited by vacuum ultraviolet-ray, in particular, as a green light-emitting phosphor, and then, completed the present invention.

That is, the present invention provides a phosphor comprising a compound represented by a formula $M^1_{1-a}M^2_{11-b}Mn_{a+b}O_{18-(a+b)/2}$ (wherein, $M^1$ represents at least one of materials selected from the group consisting of La, Y and Gd, and $M^2$ represents at least one of materials selected from the group consisting of Al and Ga, a represents an number in a range from not less than 0 to less than 1, b represents a number in a range from not less than 0 to less than 1, and sum of a and b is greater than 0).

Moreover, the present invention also provides a light emitting element excited by vacuum ultraviolet-ray comprising the above-mentioned phosphor.

DETAILED DESCRIPTION OF THE PRESENT INVENTION

The following description will discuss the present invention in detail.

The phosphor of the present invention is suitably used for a vacuum ultraviolet-ray exciting light-emitting element.

The phosphor of the present invention comprises a compound represented by a formula, $M^1_{1-a}M^2_{11-b}Mn_{a+b}O_{18-(a+b)/2}$. In this formula, $M^1$ represents at least one of materials selected from the group consisting of La, Y and Gd, and $M^2$ represents at least one of materials selected from the group consisting of Al and Ga. And, a represents a number in a range from not less than 0 to less than 1, b represents a number in a range from not less than 0 to less than 1, and sum of a and b is greater than 0.

Mn is an activating agent and it may substitute a part of either one of $M^1$ and $M^2$, and is usually substitute $M^2$. The preferable range of the sum of a and b, a+b, which means the content of Mn in the phosphor, is in a range from not less than 0.001 to not more than 1, more preferable is a range from not less than 0.01 to not more 0.7, most preferable is a range from not less than 0.02 to not more than 0.5.

The phosphor preferably contains both of La and Y as $M^1$. Moreover, the preferable content of Y in the molar ratio of Y/(La+Y) is from 0.0001 to 0.8, more preferable is from 0.001 to 0.6, most preferable is from 0.01 to 0.5.

The phosphor preferably contains at least Al as $M^2$, more preferably, contains only Al. In the case where the phosphor contains Al and Ga as $M^2$, the greater the content of Al in the phosphor, the more preferable from the viewpoint of the brightness after plasma exposure becomes higher.

The preparation method for the phosphor of the present invention is not particularly limited, and may include, for example, a method of firing a mixture of metal compounds to form by firing a compound represented by the formula, $M^1_{1-a}M^2_{11-b}Mn_{a+b}O_{18-(a+b)/2}$ (in the formula, $M^1$ and $M^2$ represents the same as described above, and a represents a number in a range from not less than 0 to less than 1, b represents a number in a range from not less than 0 to less than 1, and a+b is greater than 0).

In the case where the phosphor contains Al, alumina having high purity (not less than 99.9% in purity) and either of crystal structure of α alumina or intermediate alumina, aluminum hydroxide having high purity (not less than 99% in purity), aluminum nitrate, halogenated aluminum and the like may be used as the aluminum source used for preparing the phosphor. With respect to compounds of metal element other than aluminum, the compounds such as metal hydroxides, metal carbonates, metal nitrates, metal halides and metal oxalates, having high purity (not less than 99%), which are decomposed at a high temperature to produce its oxide, or an metal oxide having high purity (not less than 99.9%), may be used.

The above-mentioned compounds are weighed and mixed so as to form a predetermined composition, and then calcined to produce the phosphor. These raw materials may be mixed by usual and industrial method such as ball mills, V-shaped mixers, stirrers and the like.

After the mixing process, the mixture is firing, for example, for about 1 to about 100 hours in a temperature range of about 800° C. to about 1600° C. to obtain the phosphor of the present invention. The firing may be conducted, for example, under inert atmosphere such as nitrogen or argon, under a oxidizing atmosphere such as air, oxygen, nitrogen containing oxygen or argon containing oxygen, and under a reducing atmosphere such as nitrogen containing hydrogen or argon containing hydrogen, and preferably conducted under a reducing atmosphere such as nitrogen or argon containing 0.1 to 10 volume % of hydrogen. Moreover, the firing may be conducted under an atmosphere such as an atmosphere containing an adequate amount of carbon so that the firing is carried out under an atmosphere having a strong reducing property. Furthermore, in order to accelerate the production of the phosphor, flux may be added thereto. In order to improve the crystallinity of the phosphor, are-firing process may be carried out, if necessary. It is preferable to carry out a re-firing process in a reducing atmosphere after a firing process in the atmosphere.

In the case where a metal hydroxide, a metal carbonate, a metal nitrate, a metal halide or a metal oxalate as a compound of metal element, which is decomposed at a high temperature to produce its oxide, a calcining process may be carried out. The calcining may be conducted, for example, in a temperature range from about 400° C. to about 800° C. prior to the firing process. The atmosphere of the calcining process may be set to either an inert atmosphere, an air atmosphere or a reducing atmosphere.

The powder of the phosphor thus obtained by the above-mentioned method may be ground by using a ball mill or a jet mill and the-like. Moreover washing or classification may be conducted, if necessary.

The phosphor of the present invention is obtained by using the above-mentioned method. The phosphor of the present invention provides high luminance upon excitation by the use of vacuum ultraviolet rays, although the reason for this has not been clarified, and also provides high brightness after a heating process or a plasma exposing process; therefore, it is desirably applied to a light emitting element excited by vacuum ultraviolet-ray for PDP's and rare gas lamps.

A PDP to which the phosphor of the present invention is applied may be manufactured by using a conventional method such as disclosed in Japanese Patent Application No. 10-195428A. Each of red, green and blue phosphors for using in a light emitting element excited by vacuum ultraviolet-ray is mixed with a binder made of a polymer, such as celluloses and polyvinyl alcohols, and an organic solvent to prepare a phosphor paste. The paste is applied to a stripe-shaped substrate surface provided with address electrodes that are located on an inner face of a back substrate, and separated by partition walls, and the surfaces of the partition wall faces, through a method such as a screen printing method, and dried to form respective phosphor layers. On this is superposed a surface glass substrate that is provided with transparent electrodes and bus electrodes aligned in a direction orthogonal to the phosphor layer, and has a dielectric layer and a protective layer formed on the inner face thereof, and bonded thereto, and the inside thereof is evacuated so that rare gas such as Xe and Ne with low-pressure is sealed therein to form a discharging space; thus, a PDP is manufactured.

EXAMPLES

The following description will discuss examples of the present invention in detail; however, the present invention is not intended to be limited by these examples.

A phosphor was placed inside a vacuum vessel, and maintained at a pressure of not more than 6.7 Pa ($5 \times 10^{-2}$ torr), and vacuum ultraviolet rays were irradiated thereto by using an excimer lamp of 146 nm (H0012 model made by Ushio Inc.); thus, measurements of the light-emitting luminance were carried out in the following manner.

The phosphor was subjected to a heating process and a plasma exposing process. The heating process was carried out by holding the material in the air at 500° C. for 30 minutes. In the plasma exposing process, the phosphor was set in an atmosphere having a composition of Xe of 5 volume % and Ne of 95 volume % at a pressure of 13.2 Pa, and this was exposed to plasma of 50W for 15 minutes.

Example 1

To prepare a compound, $La_{0.8}Y_{0.2}Mn_{0.1}Al_{10.9}O_{17.95}$ (in a formula $M^1{}_{1-a}M^2{}_{11-b}Mn_{a+b}O_{18-(a+b)/2}$, $M^1$ represents $La_{0.8}Y_{0.2}$, $M^2$ represents Al, a is 0 and b is 0.1), aluminum hydroxide, lanthanum oxide, yttrium oxide and manganese carbonate were weighed so as to set a molar ratio of Al:La:Y:Mn=10.9:0.8:0.2:0.1, and this was mixed in a wet-type ball mill using isopropyl alcohol for four hours. The solvent was evaporated under reduced-pressure from the slurry, and dried to obtain mixed powder; thus, the resulting mixed powder was maintained in an alumina crucible at 1550° C. for 24 hours to be fired, and then cooled to room temperature. Next, this was maintained in an alumina boat at 1500° C. for 2 hours in a reducing atmosphere of a mixed gas of argon and hydrogen (hydrogen content: 2 volume %) so as to be re-fired, and then cooled to room temperature. With respect to the resulting phosphor, a heating process and a plasma exposing process were carried out so that measurements of luminance under vacuum ultraviolet-ray excitation were carried out before the heating process and plasma exposing process, after the heating process, and after the heating process and plasma exposing process; consequently, green light-emissions were obtained in all the cases. The intensity of light-emission after the heating process and that after the heating process and plasma process was 100 and 86, respectively, where the intensity of light-emission before the heating process was 100.

Comparative Example 1

To prepare a compound, $Ba_{1.0}Mn_{0.1}Al_{11.9}O_{18.95}$, aluminum hydroxide, barium oxalate and manganese oxalate were weighed so as to set a molar ratio of Al:Ba:Mn=11.9:1.0:0.1, and this was stirred and mixed in isopropanol for one hour, and the solvent was then pressure-reduced and distilled to be removed, and dried to obtain mixed powder. The resulting mixed powder was maintained in an alumina combustion boat at 1450° C. for 2 hours in a reducing atmosphere of a mixed gas of argon and hydrogen (hydrogen content: 2 volume %) so as to be fired, and then cooled to room temperature. The resulting phosphor was subjected to a heating process and a plasma exposing process so that measurements of luminance under vacuum ultraviolet-ray excitation were carried out before the heating process and plasma exposing process, after the heating process, and after the heating process and plasma exposing process; consequently, green light-emissions were obtained in all the cases. The intensity of light-emission after the heating process and that after the heating process and plasma process was 100 and 72, respectively, where the intensity of light-emission before the heating process was 100.

The phosphor of the present invention is desirably used for a vacuum ultraviolet-ray exciting light-emitting element such as PDP's and rare gas lamps, and makes it possible to achieve a vacuum ultraviolet-ray exciting light-emitting element having high brightness; therefore, this material is effectively used in industry.

What is claimed is:

1. A phosphor comprising a compound represented by a formula $M^1{}_{1-a}M^2{}_{11-b}Mn_{a+b}O_{18-(a+b)/2}$;
wherein $M^1$ represents at least one of materials selected from the group consisting of La, Y and Gd, and $M^2$ represents at least one of materials selected from the group consisting of Al and Ga, a represents a number in a range from not less than 0 to less than 1, b represents a number in a range from not less than 0 to less than 1, and sum of a and b is greater than 0.

2. The phosphor according to claim 1, wherein the sum of a and b is from 0.001 to 1.

3. The phosphor according to claim 1 or 2, wherein $M^1$ represents La and Y.

4. The phosphor according to claim 3, wherein a mole ratio of Y to total mol of La and Y (Y/(La+Y)) is from 0.0001 to 0.8.

5. The phosphor according to claim 1, wherein $M^2$ represents either Al, or Al and Ga.

6. The phosphor according to claim 5, wherein $M^2$ is Al.

7. A light emitting element excited by vacuum ultraviolet-ray comprising a phosphor comprising a compound represented by a formula $M^1_{1-a}M^2_{11-b}Mn_{a+b}O_{18-(a+b)/2}$; wherein $M^1$ represents at least one of materials selected from the group consisting of La, Y and Gd, and $M^2$ represents at least one of materials selected from the group consisting of Al and Ga, a represents a number in a range from not less than 0 to less than 1, b represents a number in a range from not less than 0 to less than 1, and sum of a and b is greater than 0.

\* \* \* \* \*